UNITED STATES PATENT OFFICE.

RICHARD T. HILL, OF ST. LOUIS, MISSOURI.

CONCENTRATED EXTRACT OF TOBACCO.

SPECIFICATION forming part of Letters Patent No. 229,130, dated June 22, 1880.

Application filed January 6, 1880.

*To all whom it may concern:*

Be it known that I, RICHARD T. HILL, a citizen of the United States, residing at St. Louis, in the county of St. Louis and State of Missouri, have invented certain new and useful Improvements in the Manufacture of a Concentrated or Inspissated Extract of Tobacco; and I do hereby declare that the following is a full, clear, and exact description of the same, such as will enable others skilled in the art to which it appertains to make the same.

The object of the present invention is to obtain an extract of tobacco which shall contain the nicotine, gluten, albumen, gum, resins, vegetable acids, &c., which constitute the curative agents in the plant, the extract being of such a character that it will not be liable to change, decompose, or deteriorate, and so concentrated that it may be readily stored and transported, so as to become a new article of trade.

It is well known that an aqueous extract of tobacco, made by simply soaking the leaves in water, has valuable curative properties, and the same has been more or less extensively used in the treatment of skin diseases generally, and especially in cases of scab and other diseases of animals; but, so far as I am aware, there has not heretofore been manufactured an inspissated or concentrated extract of tobacco, nor does such an article exist as an article of trade.

At present the aqueous extract is in general made by the user and at the time required, and is a thin watery fluid which from its bulk cannot be conveniently or profitably transported, and from its character or nature is liable to ferment and deteriorate, so that it cannot be safely stored or kept on hand as an article of trade. Therefore, as before specified, the object of this invention is to produce a merchantable extract.

I will now proceed to describe my invention more specifically, so that others may apply the same.

I take any desired amount of leaf-tobacco, preferably selecting the darker and stronger grades, place the same in a suitable wooden tank, and pour over it cold water just sufficient to fully cover it, weights being put upon the tobacco to keep it submerged. In this cold water it is allowed to soak for three hours, more or less, and is then, together with the liquid, transferred to a suitable kettle, wherein it is slowly heated up to about 120° Fahrenheit or 130° Fahrenheit, and is kept at that temperature for about an hour. It is next removed to a suitable press and all the liquid expressed, leaving the leaf exhausted. The juices thus expressed and all the liquid obtained as before specified are collected and a mineral acid, such as muriatic or sulphuric or the like, added thereto until a slightly acid reaction is had. The exact quantity of acid to be added cannot be given, as it will vary according to the nature of the leaf; but this is immaterial, as the operator can readily determine when sufficient acid has been added by testing the liquid with litmus-paper. The liquid thus acidulated is then transferred to suitable evaporating-pans, and the evaporation allowed to proceed until the mass assumes a consistency between a pine-tar and a solid. While there is much water present the evaporation may be conducted rapidly; but toward the close of the process the evaporation must be conducted slowly and carefully to avoid burning the extract.

The addition of the mineral acid fixes the nicotine so that it is not volatilized by the heat necessarily applied in the preparation of the extract, and when the extract has been reduced to the consistency specified it has been deprived of any water which would induce fermentation.

An analysis of an extract made in accordance with this specification will show that the extract contains all the constituents of the plant which give it its curative properties—viz., nicotine, citric and malic acids, gluten, albumen, gum, bitter extract, resin, and organic salts; and it will be found that the nicotine will average more than twelve per cent., while any ordinary watery extract made from like tobacco, but without the use of an acid, will scarcely exceed five per cent.

By macerating the tobacco and expressing the juices before adding the mineral acid the leaf will be left in a condition to be utilized, as hereinbefore set forth.

I am aware that in making an analysis to ascertain the per cent. of nicotine present the leaf has been treated with acidulated water, and the liquid thus obtained evaporated to obtain an extract, from which the nicotine was subsequently extracted by alcohol, &c., and do not herein claim such subject-matter; but in as far as the extract thus mentioned was an intermediate step in a process, and no knowledge of the nature and character of such extract is obtainable, and because such extract was in all probability of the consistency of the usual and well-known fluid extracts, and, furthermore, for the reason that I am not aware of any such extract as that herein described by me having been produced before my invention thereof; therefore, Having thus fully set forth my invention, what I claim, and desire to secure by Letters Patent, is—

As a new article of manufacture and trade, an inspissated or concentrated extract of tobacco having about the consistency of pine-tar, and containing the nicotine, resin, gluten, albumen, resin vegetable acids, and organic salts, substantially as specified.

In testimony whereof I hereunto affix my signature in the presence of two subscribing witnesses.

RICHARD T. HILL.

Witnesses:
H. B. MOULTON,
F. W. RITTER, Jr.